Aug. 29, 1950     P. R. HIRSH     2,520,403
WIRE-WRAPPING MACHINE
Filed Sept. 30, 1944     5 Sheets-Sheet 1
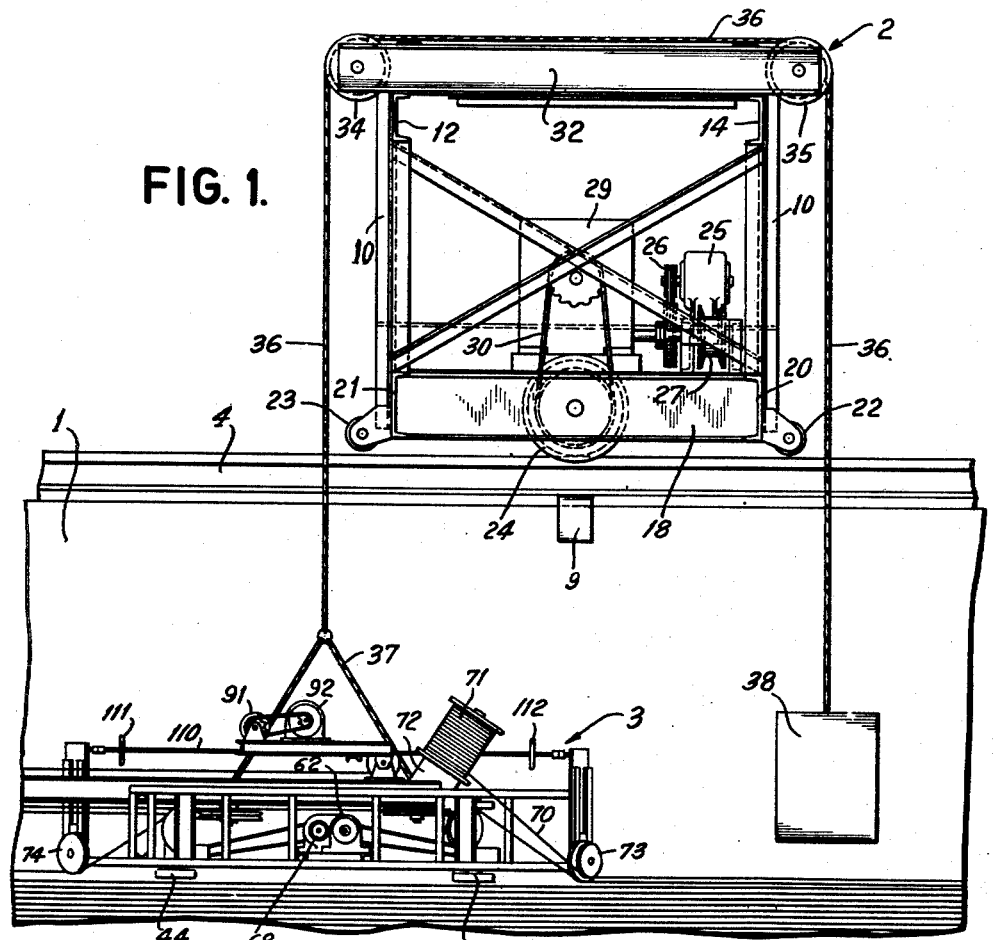
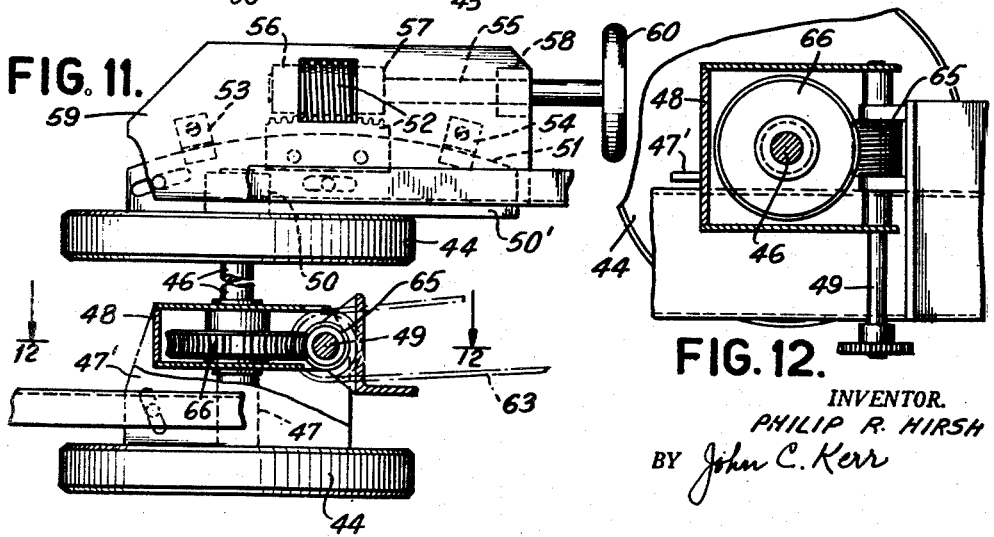
INVENTOR.
PHILIP R. HIRSH
BY John C. Kerr Aug. 29, 1950 P. R. HIRSH 2,520,403
WIRE-WRAPPING MACHINE
Filed Sept. 30, 1944 5 Sheets-Sheet 2

INVENTOR.
PHILIP R. HIRSH
BY John C. Kerr

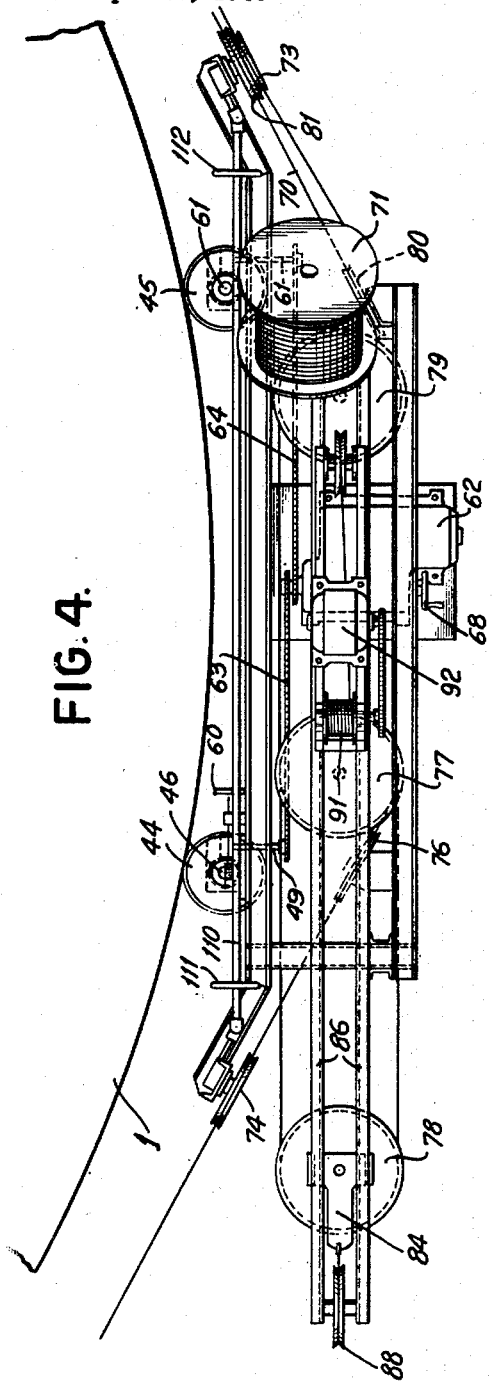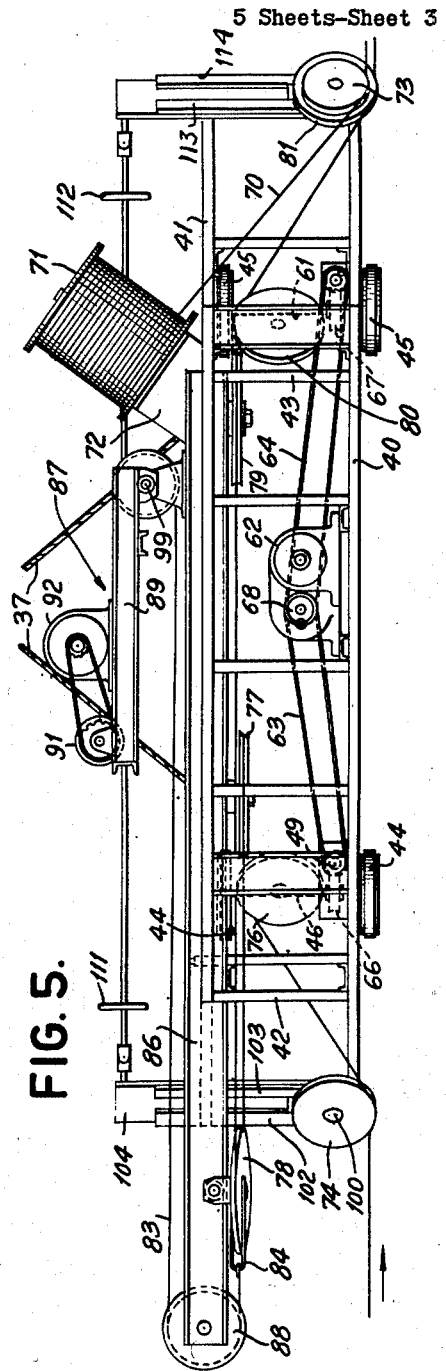

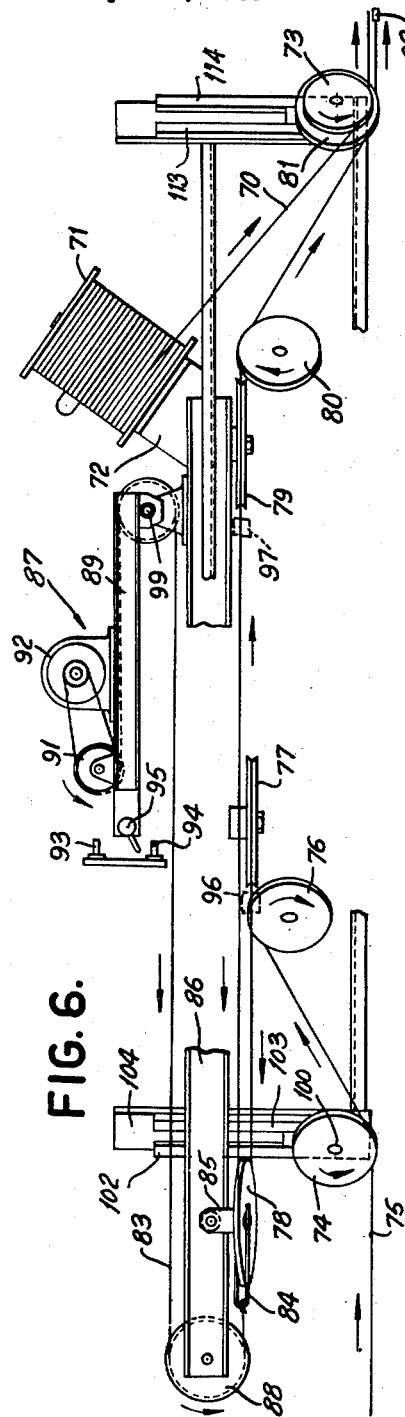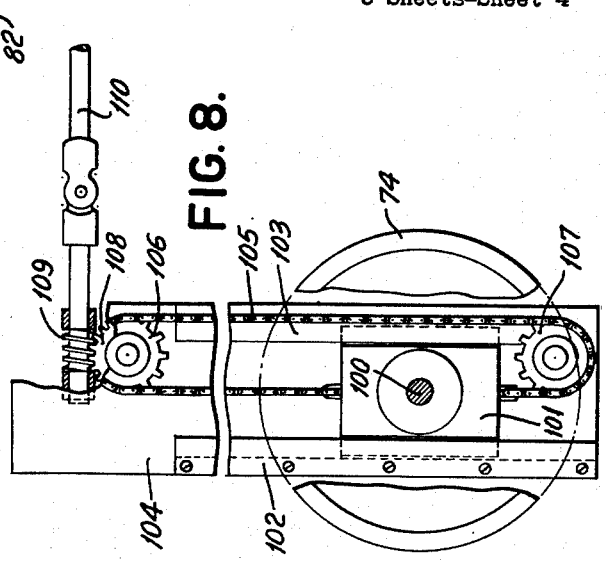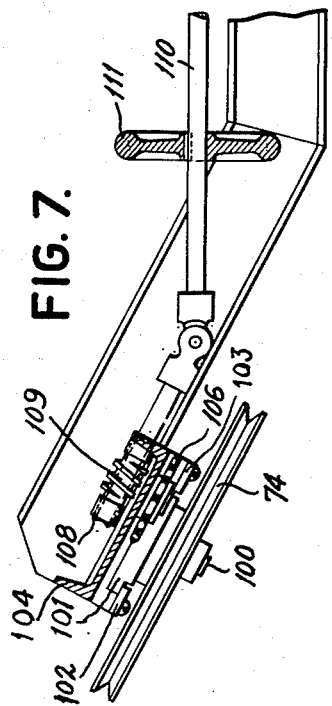

Aug. 29, 1950 P. R. HIRSH 2,520,403
WIRE-WRAPPING MACHINE
Filed Sept. 30, 1944 5 Sheets-Sheet 5

INVENTOR.
PHILIP R. HIRSH
BY John C. Kerr

Patented Aug. 29, 1950

2,520,403

UNITED STATES PATENT OFFICE 2,520,403

WIRE-WRAPPING MACHINE

Philip R. Hirsh, Montclair, N. J., assignor to Lock Joint Pipe Company, East Orange, N. J., a corporation of New Jersey Application September 30, 1944, Serial No. 556,583

12 Claims. (Cl. 242—7)

This invention relates to machines for wrapping wire under tension about vertically standing objects, such as tanks, standpipes, large diameter pipes, and like structures.

It is an object of the invention to provide a machine capable of operating a wire winding mechanism in vertical movement and circumferential movement for wrapping a tensioned wire about a vertically standing structure. Another object of the invention is to provide a wire-winding machine which is supported from a vertically standing object about which a wrapping of wire is thereby applied.

Another object of the invention is to provide mechanism for controlling the vertical travel and the circumferential travel of a wire-wrapping carriage about an upstanding structure and wherein the rate of vertical and circumferential travel may be varied with respect to each other for controlling the pitch of a helical winding of wire.

Another object of the invention is to provide a carriage for a wire-winding mechanism wherein the carriage is provided with motive power for advancing the carriage circumferentially about an object, and in a selected direction, to apply wire around the object at any desired pitch.

Another object of the invention is to provide a support for a wire-winding mechanism which is mountable upon an object and which contains mechanism for simultaneously controlling the vertical and circumferential travel of the carriage over the surface of the object.

Further and other objects of the present invention will be hereinafter set forth in the accompanying specification and claims and demonstrated by the drawings which show by way of illustration a preferred embodiment and the principle of my invention and what I now consider the best mode in which I have contemplated applying that principle. Other embodiments of the invention employing the same principle may be used and structural changes made as desired by those skilled in the art within the spirit of the appended claims and without departing from the present invention.

Referring to the drawings,

Fig. 1 illustrates a front elevation of a machine embodying the principle of the invention in the process of applying a wire about a tank;

Fig. 4 is a plan of wire-winding mechanism and its carriage;

Fig. 5 is a front elevational view of the carriage and wire-winding mechanism shown in Fig. 4;

Fig. 6 is a schematic illustration of the manner in which a wire and tension-applying cable are trained over sheaves of the wire-winding mechanism;

Fig. 7 is a horizontal sectional view of mechanism for changing the position of a guide sheave on the carriage;

Fig. 8 is a vertical view of the mechanism shown in Fig. 7;

Fig. 11 shows details of a drive for the carriage wheels and manipulative means for changing their direction of travel;

Fig. 12 is a section on line 12—12 of Fig. 11.

Figure 2:
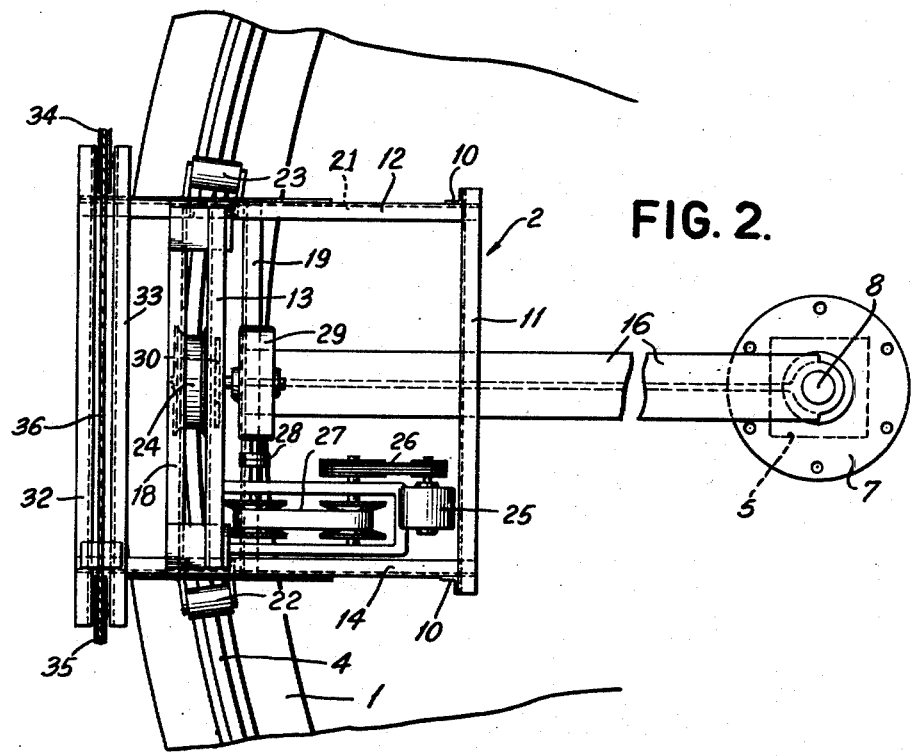
Fig. 2 is a plan of the support for the wire-winding carriage shown in Fig. 1.

The machine shown in Fig. 1 is illustrated in the process of winding a wire about a cylindrical tank 1 standing with its axis vertical. This machine includes a travelling support 2 and a carriage 3 for containing the wire-winding mechanism. The tank illustrated is for the purpose of demonstrating a particular application of the invention, but it will be understood that the tank may represent any other kind of vertically standing object about which a tensioned wrapping is to be applied. The carriage serves as an elevator which carries the wire-winding mechanism vertically with respect to the surface of the tank as the carriage travels circumferentially about the tank during a wire-winding operation. The weight of the carriage is counterbalanced or supported by suspension from the travelling support.

The support 2 is mainly supported on an overhead track consisting of a rail 4 which may be temporarily placed upon the top edge of the tank so that the support may repeatedly travel around the tank in a circular path. A post 5 affords support for the support 2 at the center of the tank. This post 5 may be steadied by guys 6 having connection with a ring 7 through which a bearing pin 8 extends. The bearing pin 8 is fixed in the post 5. A plurality of guys 6 extend radially from the post and each guy has a hook member 9 engaging the outer wall of the tank and a turnbuckle.

The support 2 is in the form of a travelling carriage. It may be variously constructed and in the drawings I have shown a box-like frame having four corner posts 10 which are connected by members 11, 12, 13 and 14 at their tops and a similar set of members at their lower ends. The bottom rear member 15 rests upon an H-beam 16 having a sleeve 17 at its inner end which engages the bearing pin 8. The outer or front end of the H-beam is connected to bottom crossmember 19 of the box frame. Cross-members 18 and 19 extend between bottom side members 20 and 21. Rollers 22 and 23 are carried by brackets extending from the box frame and are so disposed as to prevent the frame from tipping.

The frame and H-beam 16 travel as a rigid body about the tank with bearing post 8 as a center. This structure is supported by a roller 24 which is carried by journals mounted on bottom crossmembers 18 and 19 whereby substantially the entire weight of the structure and its load are transmitted to the rail 4.

The power for driving the support comprising the frame structure and H-beam includes a motor 25 having a chain or belt connection 26 with a variable speed transmission 27. This latter is connected by a coupling 28 to a speed reducer 29. A chain 30 connects a sprocket wheel on the speed reducer output shaft with a sprocket wheel which is carried by the shaft upon which roller 24 is mounted.

The top structural members 12 and 14 of the box frame extend outwardly in cantilever fashion and overhang beyond the roller 24. These structural members are connected with channel members 32, 33 at the ends of which are mounted pulleys 34 and 35. Pulleys 34 and 35 provide for the support and free travel of a chain or cable 36 by which the carriage 3 for the wire-winding mechanism is supported. One end of the chain is connected to the carriage by a bridle 37 and its other end has suspended from it a counterweight 38, Fig. 1. The counterweight is to offset the weight of the carriage so that the carriage is free to rise or fall under its own control during a wire-winding operation in the manner hereinafter described. The carriage is illustrated on an enlarged scale in Figs. 4 and 5.

The carriage for the wire-winding mechanism includes a frame structure having a lower rectangular frame 40 and an upper rectangular frame 41 connected together by a number of standards, such as 42, 43 (Fig. 5), and is otherwise braced. The upper and lower rectangular frame and the standards and braces may be formed by structural elements such as channel irons or angle irons and, as illustrated in the drawings, to produce an open frame. This frame is suspended from support 2 by chain 36 and bridle 37. A platform is provided on the carriage for the convenience of an operator, but this is not shown for clarity of illustration.

During the wire-winding operation, the carriage is drawn and held against the wall of the object being wrapped incident to the tension being applied to the wrapping. Trucks consisting of sets of rollers 44, 45, are mounted upon the carriage and contact with the surface of the object. Traction for the carriage is obtained through the sets of rollers.

The pair of rollers 44 is keyed to shaft 46, one end of which is mounted in bearing 47 which is carried by a plate 47' attached to a gear case 48, Figs. 11 and 12. The plate 47' and case 48 are pivotally adjusted about shaft 49 by which they are supported in conjunction with rear structural elements of the carriage. The upper end of shaft 46 is mounted in a bearing 50 which is supported on a slide member 50', Fig. 11. This slide member has an arcuate edge 51 having its center at shaft 49.

The angularity of shaft 46 and hence the inclination of the pair of rollers 44 may be varied by sliding plate 50' to the left or right, Fig. 11, by means of a worm and gear sector 52. The movement of plate 50' is guided by a pair of clips 53, 54 which engage the curvilinear edge 51 of the plate. The actuating worm is carried by a shaft 55 which is mounted in bearings 56, 57 and 58. These bearings are mounted on a plate 59 which is fastened to the carriage. A hand wheel 60 is provided at the end of shaft 55 so that the angularity of shaft 46 with respect to the carriage may be changed at will by an operator on the cariage.

It will be apparent that a variation of the angularity of roller shaft 46 will affect the direction of circumferential movement of the carriage about the tank, and that the amount of inclination of shaft 46 will determine the pitch of the wire which is being wrapped around the tank. As the inclination of the roller shaft 46 is under the control of an operator, the pitch of the wire may be varied from time to time, if desired, for laying fewer turns of wire per unit height of the tank as the wrapping progresses upwardly.

The set of rollers 45 is mounted on shaft 61 and the bearings for the shaft are carried by the carriage and are fixed with respect thereto since no variation of the inclination of that shaft is required.

Roller shafts 46 and 61 are driven from a motor 62, which, preferably, is part of a variable speed motor reduction unit, Figs. 4 and 5. The drive from the unit is through chains 63, 64, respectively. Chain 63 engages a sprocket on shaft 49, Figs. 11 and 12, to which is keyed a worm 65. The worm engages the worm gear 66 on roller shaft 46. A similar worm and worm gear connection 67 receives power from chain 64 and transmits motion to roller shaft 61 of the rear pair of rollers 45.

By controlling the speed of the output shaft of the variable speed motor reduction unit the rate of applying the winding may be determined. This control is capable of manual control by means of hand wheel 68. In order that the carriage and its support 2 be driven at the same rate around the tank, an electrical control system may be provided, if desired, for synchronizing the operation of the carriage motor 62 and the operation of motor 25 by which the support is driven. Uniformity of travel of the support and the carriage may also be obtained by having an operator on the support observe the disposition of the vertical extension of chain 36 supporting the carriage and make suitable adjustment of the variable speed transmission 27 in order to maintain the length of chain between the support and the carriage substantially vertical during a wire-winding operation.

The function of the wire winding mechanism is to enable the winding of a wire under tension about a tank, standpipe or a large diameter pipe. A number of sheaves are provided for guiding the wire during a winding operation and for cooperation with a tensioning device designed for maintaining the wire under a predetermined tension as it is being applied to the object. While the arrangement of the sheaves may be changed so as to enable winding of wire in either direction about an object, with the rollers 44 constituting the steering truck the wire winding mechanism is arranged for applying a wire in a clockwise direction as seen from above.

In Fig. 6 I have illustrated the course of the wire through the winding and tensioned mechanism. The wire 70 is supplied from a spool 71 which is mounted upon a bracket 72 on the carriage 3. The bracket has a spindle about which the spool may rotate as the wire is drawn from it. In threading the wire through the wire winding mechanism it is drawn over sheave 73, then passed around the object one or more times and then passed over sheave 74 at the other end of the winding mechanism (Figs. 4, 5 and 6). The one or more turns about the object are in advance of the final turns of wire which remain on the object as a permanent part of its construction. In many cases one turn of the wire will suffice but more can be made in order to assure frictional resistance between spool 71 and the portion 75 of the advance winding which comes to the winding mechanism after it encircles the object.

After passing over sheave 74 the wire passes successively over sheaves 76 and 77, each of which is free to rotate on a fixed shaft. The wire then passes over floating sheave 78 and sheaves 79, 80 and 81, which are free to rotate. Shafts of sheaves 73, 74, 76, 77, 79, 80 and 81 are carried upon brackets extending from structural elements of the carriage. These seven sheaves are idlers for changing the direction of the wire. The positions of sheaves 14 and of sheaves 73 and 81 are adjustable with respect to the carriage for purposes hereinafter described.

Upon leaving sheave 80 the wire passes over sheave 81 and its end is anchored at 82, which is the starting point for the permanent winding. This ordinarily would be located at the lowest point of an object to which wire reinforcing is to be applied. The anchor is a fixed member solidly attached to the exterior of the object. Tension is applied to the wire by the application of force to the floating sheave 78.

When the machine is first threaded, sheave 78 is at its most right-hand position, just to the left of sheave 77 (Fig. 6), and a loop of the wire is engaged thereby. The loop is intermediate separated windings, i. e., intermediate the temporary advance winding and the permanent winding. Force is applied to sheave 78 through a cable 83 which is attached to a yoke 84. This yoke is suspended from a trolley 85 which carries the yoke and shaft upon which sheave 78 is mounted, the arms of the yoke serving to support the end of the shaft at either side of the sheave. Trolley 85 is provided with a pair of rollers which bear upon the flanges of an H-beam 86. Beam structure 86 is fixed to and is carried by the wire winding carriage and it serves to support the wire tensioning mechanism 87 (Figs. 4, 5 and 6). Upon the left end of beam 86 there is mounted a freely rotatable guide sheave 88 over which cable 83 passes.

The wire tensioning mechanism illustrated comprises a weighing beam 89 pivotally mounted at 99 and carrying at its free end a winch 91 which is driven by motor 92. The cable attached to yoke 84 and passing over sheave 88 extends to winch 91 to which it is attached. In the operation of the wire tensioning device, the weighing beam 89 floats between stops 93 and 94 which operate a switch 95 on weighing beam 89 by which the operation of the motor is controlled. Weighing beam 89 maintains cable 83 in tension and the amount of tension can be varied by changing the load applied on the weighing beam. As the wire is wound about the object, it is extended in length as the result of the tension applied thereto through sheave 78 and this extension is taken up by the permissible movement of sheave 78 between sheave 77 and sheave 88. In travelling from its extreme right-hand position to its extreme left-hand position, as shown in Fig. 6, cable 83 is maintained taut while at the same time it is being taken up by winch 91 under the operation of the motor 92; which is started when stop 94 operates switch 95 as the weighing beam drops. The operation of the motor is discontinued when weighing beam 89 rises sufficiently to cause stop 93 to operate switch 95 and break the motor connection.

When a wire winding operation has proceeded to such an extent that sheave 78 has reached the end of its travel, it becomes necessary to stop the winding operation so as to place sheave 78 at its starting position just to the left of sheave 77. The operation of the machine is discontinued for accomplishing this and the tensioned wire is temporarily clamped to the frame of the carriage by hand clamps 96, 97 which are mounted on brackets extending from the carriage. By these clamping means, the wire permanently wound about the object and which comes to the carriage over sheave 81, and the portion 75 of the wire which comes to the carriage over sheave 74 can be held without loss of tension so that the operation of the wire tensioning device 87 may be temporarily discontinued. Upon effecting this clamping and the release of tension in cable 83, sheave 78 can be moved to its starting position at the left of sheave 77, a section of wire of the loop of wire between the clamps removed, and the cut end of one of the reaches of the wire threaded over sheave 78 and then spliced to the cut end of the other reach of wire. For splicing the cut ends of the wire together I prefer to use a sleeve connector which is fastened to the wires by compression thereupon and frictionally engages both ends.

After the wire has been spliced, the operating tension may be re-applied to the wire by exerting the proper amount of pull on cable 83 by causing operation of the tension applying mechanism 87. Thereafter the clamping effect of clamps 96 and 97 on the wire is removed and the machine is ready for continuing the winding operation under the same conditions of tension that prevailed before making the splice. When the supply of wire from spool 71 is exhausted, the empty spool may be replaced by a filled spool and its wire spliced to the end of the wire temporarily encircling the tank between sheaves 73 and 74.

Guide sheaves 74, 73 and 81 may be rotatably mounted on permanently positioned shafts but I prefer to mount them on shafts so supported as to permit their positions to be adjusted vertically with respect to the carriage to enable the wire winding machine to start wrapping an object at its bottom and to end the wrapping at its top. As shown in the drawings, particularly in Figs. 5 and 6, the positions of these sheaves are close to the lower part of the carriage and in this position the beginning of the wrapping can start at the bottom of the object. Except for the last turns at the top of the object, these sheaves may remain, if desired, in the positions illustrated in the drawings, but in order to complete the winding of the object at its top, provision is made for moving the sheaves to the upper portion of the carriage. This is desirable because the exterior of the object laterally supports the carriage by reason of the pressure exerted by the tensioned wire on the carriage and rollers 44 and 45. Sheaves 73 and 81 are supported and moved similarly to sheave 74 and it will suffice to explain the operating and supporting structure for the latter sheave.

Sheave 74, Figs. 4, 5, 6, 7 and 8, is supported on a stud shaft 100, which is carried by a slide 101. Parallel rails 102 and 103 on plate 104 are provided for guiding the slide. Plate 104 is secured to horizontal members of the carriage frame which extend beyond the end of the frame. Slide 101 has fastened to it the ends of an endless chain 105 which passes over sprocket wheels 106, 107 carried by shafts extending from plate 104. Sprocket wheel 106 is keyed to a shaft carrying a worm wheel 108 which is engaged by a worm 109. The shaft of worm 109 is connected to a shaft 110 having hand wheels 111, 112 which are readily accessible to an operator. The mechanism for adjusting the position of the sheaves 73 and 81 along guide rails 113, 114 at the other end of the carriage is arranged and constructed similarly to that for adjusting the position of sheave 74, and its worm wheel shaft is similarly connected to hand wheel shaft 110. The worm gears and worms are of the self-locking type whereby the sheaves are held in any set position.

It is apparent from the description of operation of the mechanism for changing the positions of sheaves 74, 73 and 81 that the spacing of the wrappings of wire about the object can be changed independently of any change in the elevation of the carriage. This may be accomplished under manual control by having an operator gradually lift the sheaves by turning one of the hand wheels 111, 112 as the carriage is travelling about the object. The upper limit of movement of the sheaves, with respect to the carriage, need be sufficient only to permit winding to a point just above the uppermost of rollers 44, 45 by which the carriage is supported against the object under the influence of the tensioned wrapping.

When the last turn of wire has been laid against the object, the machine is stopped and the wire is securely fastened to an anchor fixed to the object. When the wire is secured, the tension on the wire is released and the end of the wire beyond the anchor is cut.

If it should be considered desirable, turns of wire about the object may be occasionally anchored to members fixed in the wall of the object, but this practice is not deemed indispensable because the present invention enables the tensioning of wire about an object within desired limits which are carefully computed beforehand and therefore are known to be below the maximum breaking strength of the wire.

Figure 3:
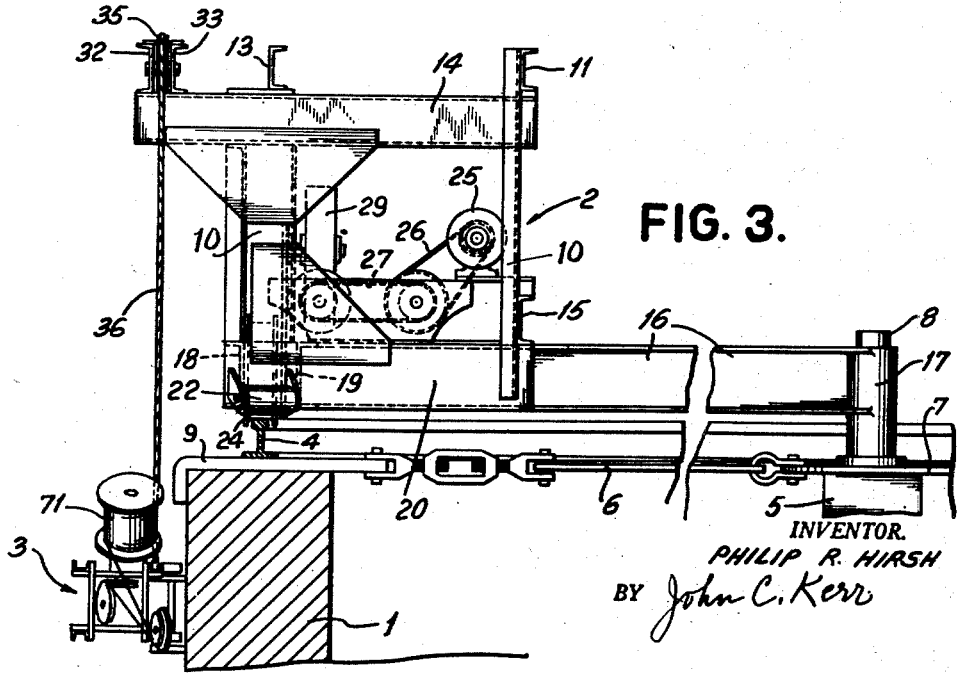
Fig. 3 is a side elevation of the wire-winding machine shown in Fig. 1, and the support for the wire-winding carriage shown in Fig. 2.
Figure 9:
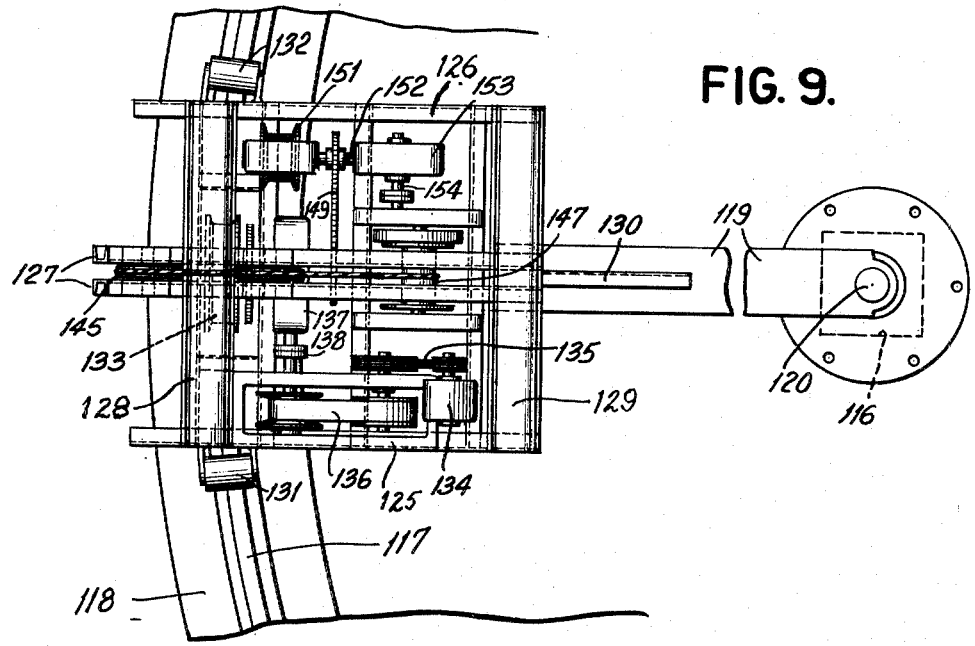
Fig. 9 is a plan of a modified form of support for a wire-winding mechanism carriage.
Figure 10:
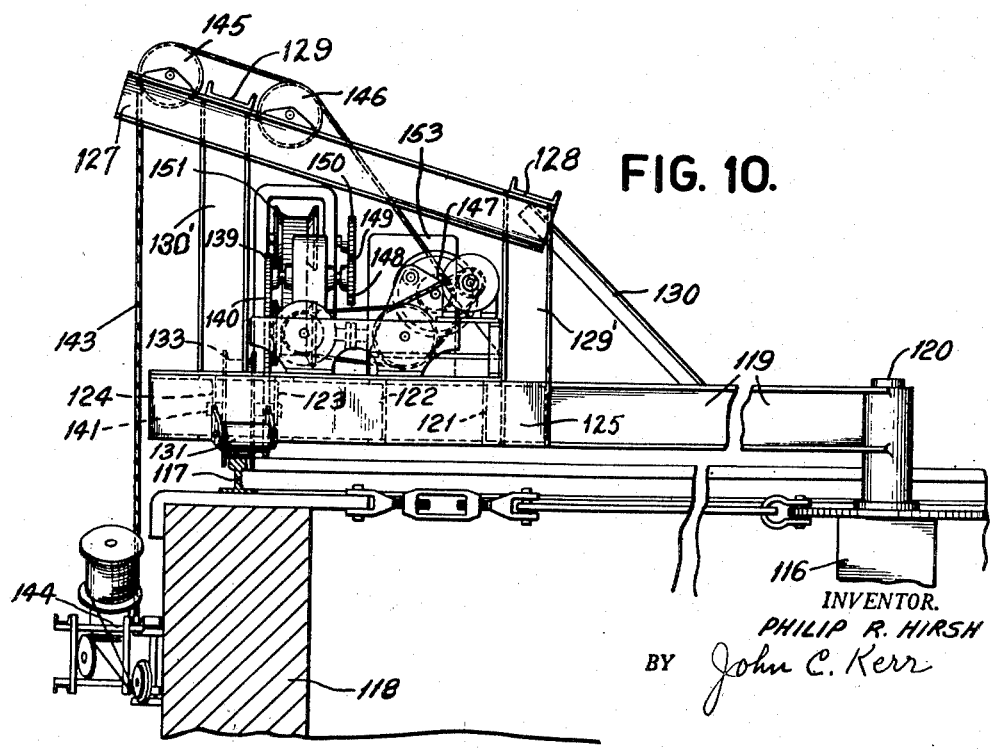
Fig. 10 is a side elevational view of the support illustrated in Fig. 9 showing a wire-winding carriage suspended therefrom.

An optional form of support for the carriage and wire wrapping mechanism is illustrated in Figs. 9 and 10. The frame structure of this support may be constructed similarly to the one illustrated in Figs. 1, 2 and 3 and similarly mounted. The pivoted end of the support is mounted upon a center post 116 and the outer end of the support is supported by a rail 117 of a circular track which is mounted over the wall of the tank 118. The support includes an H-beam 119 extending from a bearing pin 120, with which it is pivotally engaged, to over the tank wall. A plurality of horizontal floor beams 121, 122 and 123 extend laterally from each side of the H-beam 119. These floor beams and beam 124 at the front of the support are connected at their outermost ends by channel irons 125 and 126, one at each side of the frame. A crane arm, which extends beyond the exterior of the tank wall 118, is composed of two structural members 127 supported by channel members 128 and 129 and a brace 130 extending rearwardly and attached to beam 119. Four corner posts, such as 129' and 130' support channel members 128 and 129 at their ends. The lower ends of these posts are attached to and supported by side beams 125 and 126. Rollers 131 and 132 are mounted on brackets which extend from side beams 125 and 126, respectively, and serve to prevent the frame from tipping. The whole support constitutes a travelling crane or carriage.

The greater part of the frame and its load is supported by a roller 133 which bears upon rail 117. Roller 133 is journalled between beams 123 and 124. The frame is driven in a circular path about bearing pin 120, as a center, by power transmitted to roller 133. Motor 134 provides the motive force. This motor has a belt connection 135 with a variable speed transmission 136 which in turn drives a speed reducer 137 through a coupling 138. The output shaft of the speed reducer 137 carries a sprocket wheel 139 by which chain 140 is driven. This chain is connected with a sprocket wheel secured to shaft 141 on which the roller 133 is keyed. By suitable adjustment of the variable speed transmission 136, the rate of travel of the support along rail 117 may be varied.

The carriage and wire-winding mechanism is suspended from the support by a chain or cable 143 whose lower end is connected to the carriage 144. This cable extends upwardly, over sheave 145 and sheave 146 to a winch 147 to which it is connected. The winch takes the load of the carriage and wire-winding mechanism and also controls their elevation. By controlling the rate of revolution of the winch the spacing of the successive turns of the wire about the object may be determined. It is apparent that the relationship between the rate of rising of the carriage and the rate of circumferential movement of the carriage about the tank affects the pitch of the wire being wound about the tank. In order to synchronize these two movements, and to make their relationship adjustable by an operator, it is convenient to drive the support and the winch from a common source of motive power. Accordingly, the drive for the winch is taken from the output shaft of speed reducer 137. Sprocket wheel 148 on the output shaft drives a chain 149 which in turn drives a sprocket wheel 150 of variable speed transmission 151. Shaft 152, connected with the output side of the variable speed transmission 151, drives speed reducer 153 which in turn drives winch 147 through shaft 154. It is thus apparent that the rate of rising of the carriage may be changed with respect to the circumferential horizontal movement of the carriage by changing the adjustment of the variable speed transmission 151.

The rate of travel of the carriage for the wire-winding mechanism is under the control of motor 62, which is mounted on the carriage, Figs. 4 and 5, and, as the over-head support should have the same rate of travel around the tank, suitable adjustment of the variable speed transmission 136 may be made to bring about this result. This adjustment may be made manually, or by servomotors adjusted to synchronize the speed of travel of the carriage and its over-head support. After this adjustment has been made, the spacing of the turns will be determined in accordance with the setting of the variable speed transmission 151 through which the drive comes for elevating the carriage.

I have described hereinbefore means mounted on the carriage for effecting a change in direction of travel of the carriage in travelling circumferentially around the tank. This means includes hand control of the steering of the shaft upon which the set of rollers 44 is mounted. It will be appreciated that when the rate of operation of the winch on the over-head support controls the rate of rising of the carriage it will not be necessary to steer the carriage by altering the inclination of the set of rollers 44, and that in such case the rollers may be permitted to assume their natural inclination during a wire-winding operation.

A carriage movable over the surface of a tank and carrying plastic material-projecting apparatus may be employed to cover wire previously wrapped about the tank. The over-head travelling carriages described herein may be employed to raise and traverse such a carriage about a tank or other object for the purpose of applying a coating of mortar.

This application is a continuation-in-part of my copending application Serial No. 550,122, filed August 18, 1944.

What is claimed is:

1. In a machine for applying wire about an object, the combination comprising a carriage, rollers mounted on said carriage for engaging the surface of an object to be wire-wrapped, said carriage being adapted to be driven about the object entirely by traction developed between said rollers and the surface of the object, wire-wrapping mechanism carried by said carriage, said wire-wrapping mechanism including sheaves for engaging a portion of wire intermediate separate windings of wire about said object, means carried by said carriage and having connection with said wire-wrapping mechanism for applying tension to said wire, and separate and distinct means mounted on said carriage for advancing said carriage over the surface of the object during a wire-wrapping operation, said carriage-advancing means including motor means and driving connections with said rollers whereby said carriage is advanced by the traction of said rollers on the surface of said object and tension is applied to said wire solely by said tension-applying means.

2. In a machine for applying wire about an object, the combination comprising a carriage, rollers mounted on said carriage for engaging the surface of an object to be wire-wrapped, said rollers including steerable rollers, said carriage being adapted to be driven about the object entirely by traction developed between said rollers and the surface of the object, means having connection with said steerable rollers for controlling the direction of travel of said carriage over the surface of said object, wire-wrapping mechanism carried by said carriage, said wire-wrapping mechanism including sheaves for engaging a portion of wire intermediate separate windings of wire about said object, means carried by said carriage and having connection with said wire-wrapping mechanism for applying tension to said wire, and separate and distinct means mounted on said carriage for advancing said carriage over the surface of the object during a wire-wrapping operation, said carriage-advancing means including motor means and driving connections with said rollers whereby said carriage is advanced by the traction of said rollers on the surface of said object and said wire is tensioned solely by said tension-applying means.

3. A machine for applying a wire about a tank or like stationary object comprising, in combination with an object having a substantially vertical wall, a carriage; wire-wrapping mechanism mounted on said carriage; means including rollers for supporting said carriage in rolling contact with said wall of said object; means supporting said carriage opposite said wall, said second-named supporting means including a track concentric with said wall, a center post, a carriage supported on said track and center post, and a counterweight for suspending said first-named carriage from said second-named carriage and acting with equal effect against the weight of said first-named carriage to balance the carriage for free vertical movement; means for driving said last-named carriage over said track; and means for driving said first-named carriage over said object during a wire-wrapping operation.

4. In a machine of the class described, the combination comprising a crane, circular track means underlying one end of said crane for supporting said end during travel of the crane, a roller mounted on said crane and bearing on said track, means supporting the other end of said crane for rotation of said crane about a vertical axis, means for actuating said roller, a winch mounted on said crane, and means having connections with said roller-actuating means and said winch for driving said winch and said roller simultaneously and traversing the crane and operating the winch at related rates of speed with respect to each other.

5. A machine for applying a wire about a tank or like stationary object, comprising a wire-wrapping carriage having rollers for bearing against a tank, said wire-wrapping carriage having mounted thereon a plurality of idler sheaves over which continuations of a wire between a temporary advance wrapping and a permanent wrapping about the tank are trained from end to end of said wire-wrapping carriage, one of said idler sheaves being movable for applying tension in a loop of said continuations of wire, means carried by said wire-wrapping carriage for exerting force on said movable idler sheave whereby said wire-wrapping carriage is held against the tank and the wire trained therethrough is tensioned and free to pass without restraint as said wire-wrapping carriage travels about the tank, means mounted on said wire-wrapping carriage for actuating said carriage independently of said force-exerting means, said last-named means including a motor carried by said wire-wrapping carriage and driving connections from said motor to at least one of said rollers, said wire-wrapping carriage being adapted to be driven about the tank entirely by traction developed between at least one of said rollers and the surface of the tank, a second carriage for supporting said wire-wrapping carriage alongside said tank, and means mounted on said second-named carriage for driving said second-named carriage, whereby wire is run into the temporary advance wrapping from the rear of said wire-wrapping carriage, is run from said temporary advance wrapping into said permanent wrapping in passing through said wire-wrapping carriage and is wrapped around the tank as both of said carriages are advanced.

6. A machine for applying a tensioned wrapping of wire about a tank or like stationary object, comprising a travelling carriage mounted on rollers to bear against a tank, said carriage being adapted to be driven about the tank entirely by traction developed between at least one of said rollers and the surface of the tank, means on said carriage for guiding relatively loose wire from the rear of said carriage and into a temporary advance wrapping about said tank, means on said carriage for guiding the wire from the other end of the temporary advance wrapping onto the front of said carriage, means on said carriage for guiding the continuation of said temporary advance wrapping into a permanent wrapping about said tank, said permanent wrapping beginning to the rear of said carriage, means intermediate said last two-mentioned guiding means for applying tension to the wire between said two wrappings as the wire travels from the front to the rear of said carriage and into the permanent wrapping as the carriage moves about said tank, a motor mounted on said carriage, connections between said motor and at least one of said rollers for driving said carriage over the surface of the tank, a second carriage for supporting said first-named carriage alongside said tank, and means mounted on said second-named carriage for driving said second-named carriage, whereby loose wire is continually run into the temporary advance wrapping and is tensioned upon leaving that wrapping and entering the permanent wrapping as said carriages are advanced about the tank.

7. A machine for applying a tensioned wrapping of wire about a tank or like stationary object, comprising a travelling carriage mounted on rollers to bear against a tank, said carriage being adapted to be driven about the tank entirely by traction developed between at least one of said rollers and the surface of said tank, means on said carriage for guiding relatively loose wire from the rear of said carriage and into a temporary advance wrapping about said tank, means on said carriage for guiding the wire from the other end of the temporary advance wrapping onto the front of said carriage, means on said carriage for guiding the continuation of said temporary advance wrapping into a permanent wrapping about said tank, said permanent wrapping beginning to the rear of said carriage, means intermediate said last two-mentioned guiding means for applying tension to the wire between said two wrappings as the wire travels from the front to the rear of said carriage and into the permanent wrapping as the carriage moves over said tank, and means for advancing said carriage over the tank, whereby loose wire is continually run into the temporary advance wrapping and is tensioned upon leaving that wrapping and entering the permanent wrapping during a wire-wrapping operation, said last-named means comprising a motor mounted on said carriage and driving connections therefrom to at least one of said rollers.

8. A machine for applying a wire about a tank or like stationary object, comprising a wire-wrapping carriage having rollers for bearing against said tank, said wire-wrapping carriage being adapted to be driven about the tank entirely by traction developed between at least one of said rollers and the surface of the tank, said wire-wrapping carriage having mounted thereon a plurality of idler sheaves over which continuations from separated windings about the tank are trained from end to end of said wire-wrapping carriage, one of said idler sheaves being movable for applying tension in a loop of said continuations of wire, means carried by said wire-wrapping carriage for exerting force on said movable idler sheave whereby said wire-wrapping carriage is held against the tank and the wire trained through said wire-wrapping carriage is tensioned and free to pass without restraint as said wire-wrapping carriage travels over the tank, and means separate and distinct from said force-exerting means for actuating said carriage, said last-named means including a motor mounted on said carriage and driving connections from said motor to at least one of said rollers.

9. A machine for applying a wire about a tank or like stationary object, comprising a wire-wrapping carriage, said wire-wrapping carriage including a linearly movable idler sheave for engaging a loop of wire formed by continuations from separated windings about the tank and for placing equal stress in said continuations, tensioning means carried by said carriage for applying and automatically maintaining constant force on said idler sheave as said sheave moves and said loop of wire stretches under tension, whereby the tension applied to said loop of wire draws said carriage towards the surface of the tank, wheels mounted on said carriage and bearing against the tank, and separate and distinct means mounted on said carriage for driving at least one of said wheels and said carriage about the tank.

10. A machine for applying a tensioned wrapping of wire circumferentially about a tank or like stationary object, comprising a travelling carriage mounted on rollers to bear against the surface of a tank, said carriage being adapted to be driven about the tank entirely by traction developed between at least one of said rollers and the surface of the tank, means on said carriage for guiding relatively loose wire from the rear of said carriage and into a temporary advance wrapping about said tank, means on said carriage for guiding the wire from the other end of the temporary advance wrapping onto the front of said carriage, means on said carriage for guiding the continuation of said temporary advance wrapping into a permanent wrapping about said tank, said permanent wrapping beginning to the rear of said carriage, means for training the portion of said wire intermediate said temporary advance wrapping and said permanent wrapping through said carriage between said last two-mentioned guiding means, said training means consisting of idler sheaves over which said wire is free to pass without restraint, one of said idler sheaves being mounted for displacement whereby force may be applied thereto for taking up elongation in the wire passing through said carriage, means for applying force upon said last-named idler sheave for placing and automatically maintaining constant tension in the wire passing through said carriage intermediate said temporary advancing wrapping and said permanent wrapping, and separate and distinct means acting independently of said training means and idler sheaves for advancing said carriage over the surface of a tank whereby the loose wire is fed into said temporary advance wrapping and is tensioned intermediate said temporary advance wrapping and said permanent wrapping as the permanent wrapping is formed during the motion of said carriage and tension is applied thereto by said force-applying means, said carriage-advancing means including a motor mounted on said carriage and driving connections to at least one of said rollers.

11. In a machine of the class described, the combination comprising a crane, means located adjacent one end of said crane for engaging a vertically disposed pivot pin, a roller carried by said crane distantly from said first-named means and adapted to support said crane for traverse in a horizontal plane circularly about the pivot pin, a winch mounted on said crane, motive means for driving said roller to effect the traverse of said crane circularly about the pivot and for operating said winch, said motive means including variable speed transmission means driven by said motive means and having connection with said roller and said winch to thereby control the relative rates of rotation of said roller and winch.

12. In a machine of the class described, the combination comprising a beam, means adjacent one end of said beam for engaging a vertically disposed pivot to guide said beam for circular travel about said pivot, a rigid frame mounted upon said beam and extending laterally to both sides of said beam, a roller rotatably mounted on said frame on an axis substantially parallel to and within the vertical plane of the longitudinal axis of said beam, said roller serving to support the major portion of the weight of said frame and beam, means carried by said frame for preventing the tipping of said frame about the axis of said roller, and power-operated means mounted on said frame for driving said roller.

PHILIP R. HIRSH.

REFERENCES CITED

The following references are of record in the file of this patent:

UNITED STATES PATENTS

| Number | Name | Date |
|---|---|---|
| 101,157 | Pearson | Mar. 22, 1870 |
| 198,895 | Meharry | Jan. 1, 1878 |
| 544,479 | Davy | Aug. 13, 1895 |
| 754,586 | Maxwell | Mar. 15, 1904 |
| 1,316,589 | Nelson | Sept. 23, 1919 |
| 1,500,769 | Rosener et al. | July 8, 1924 |
| 2,364,696 | Crom | Dec. 12, 1944 |
| 2,370,780 | Crom | Mar. 6, 1945 |